(12) United States Patent
Bezbaruah et al.

(10) Patent No.: US 7,725,768 B1
(45) Date of Patent: May 25, 2010

(54) SYSTEM AND METHOD FOR HANDLING A STORAGE RESOURCE ERROR CONDITION BASED ON PRIORITY INFORMATION

(75) Inventors: Angshuman Bezbaruah, Pune (IN); Vivek V. Gupta, Pune (IN); John A. Colgrove, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

(21) Appl. No.: 12/183,324

(22) Filed: Jul. 31, 2008

Related U.S. Application Data (63) Continuation of application No. 11/008,701, filed on Dec. 9, 2004, now Pat. No. 7,409,586.

(51) Int. Cl.
   *G06F 11/00* (2006.01)
(52) U.S. Cl. .................................................. 714/15
(58) Field of Classification Search ............... 714/2, 714/6, 11, 15, 16, 18, 20, 37, 38, 42
   See application file for complete search history.

(56) References Cited

U.S. PATENT DOCUMENTS

| | | | |
|---|---|---|---|
| 3,787,815 A | | 1/1974 | Farr, Jr. |
| 5,410,700 A | * | 4/1995 | Fecteau et al. ............... 718/100 |
| 5,765,151 A | | 6/1998 | Senator |
| 6,216,137 B1 | * | 4/2001 | Nguyen et al. ............... 707/203 |
| 7,111,084 B2 | * | 9/2006 | Tan et al. ........................ 710/15 |
| 7,308,601 B2 | * | 12/2007 | Ikeuchi et al. ................... 714/6 |
| 7,428,214 B2 | * | 9/2008 | Nosella ....................... 370/228 |
| 2003/0018907 A1 | * | 1/2003 | Le et al. ...................... 713/190 |
| 2003/0018927 A1 | | 1/2003 | Gadir et al. ..................... 714/4 |
| 2004/0023646 A1 | * | 2/2004 | Inami et al. .................. 455/418 |
| 2004/0154001 A1 | | 8/2004 | Haghighat et al. ........... 717/130 |
| 2005/0021573 A1 | | 1/2005 | McDermott et al. ......... 707/204 |
| 2005/0044164 A1 | * | 2/2005 | O'Farrell et al. ............ 709/213 |
| 2005/0044165 A1 | * | 2/2005 | O'Farrell et al. ............ 709/213 |
| 2005/0195754 A1 | * | 9/2005 | Nosella ....................... 370/255 |

OTHER PUBLICATIONS

Colleen Gordon, "Successful Disaster Recovery Testing," Technical Support, May 2000, © Technical Enterprises, Inc., www.naspa.net, 4 pages.

* cited by examiner

*Primary Examiner*—Nadeem Iqbal
(74) *Attorney, Agent, or Firm*—Brenna A. Brock; Campbell Stephenson LLP (57) ABSTRACT

Various embodiments of systems and methods are disclosed for using priority information when handling error conditions for a storage resource. In some embodiments, a method involves detecting an error condition, which is associated with a storage resource, and selecting an error-correcting action in response to detection of the error condition. Selection of the error-correcting action is based on priority information. The priority information identifies respective priorities of several applications. At least one of the applications uses the storage resource when accessing application data.

21 Claims, 8 Drawing Sheets

SYSTEM AND METHOD FOR HANDLING A STORAGE RESOURCE ERROR CONDITION BASED ON PRIORITY INFORMATION

CROSS-REFERENCE TO RELATED APPLICATIONS

This application is a continuation of U.S. patent application Ser. No. 11/008,701, entitled "System and Method for Handling a Storage Resource Error Condition Based on Priority Information", filed Dec. 9, 2004 now U.S. Pat. No. 7,409,586, and naming Angshuman Bezbaruah, Vivek V. Gupta, John A. Colgrove as inventors. This application is assigned to Symantec Operating Corporation, the assignee of the present invention, and is hereby incorporated by reference, in its entirety and for all purposes, as if completely and fully set forth herein.

FIELD OF THE INVENTION

This invention relates to storage systems and, more particularly, to handling error conditions in storage systems.

BACKGROUND

Various error conditions can be encountered when using storage resources. For example, in a system that uses a disk to store file system data, an error condition (e.g., an error condition corresponding to low disk space) will be encountered if the amount of disk space occupied by the file system data exceeds a threshold amount. This error condition is typically handled by allocating more disk space, if available, to the file system. Similarly, an error condition can be encountered if a storage device experiences a failure, rendering any application data stored on that storage device unavailable. This error condition can be handled by restoring the data from a backup copy or mirror.

Another example of an error condition occurs in systems that provide multipathed access to a storage device. Multipathed access is available when there are multiple paths via which an application can access a storage device. The paths can be controlled in an active/passive configuration (i.e., a configuration in which one path (or set of paths) is active while the other path(s) are passive). If the path (referred to as the active path) that is currently being used to access the storage device fails, an error condition is generated. This error condition is handled by selecting another path by which the storage device can be accessed.

A problem encountered in the scenarios above involves the situation in which multiple applications are able to use the same storage resources. In these situations, the handling of an error condition may not necessarily be beneficial to all of the applications. For example, if two or more computing devices (each of which executes one or more applications) are able to access an active/passive multipathed array, one of the computing devices may experience a path failure on the active path. In response to the path failure, a new active path will be selected. Typically, the new active path will be selected so as to maintain connectivity with the multipathed array for the majority of the computing devices. However, some of the computing devices may not be able to access the multipathed array via the newly-selected active path. Accordingly, the selection of the new active path can result in the loss of connectivity for some computing devices. Furthermore, if the computing devices that lose connectivity are executing applications that are critical to the operation of a business, such a loss of connectivity can have disastrous effects. Thus, it is desirable to provide improved techniques for handling error conditions of this kind.

SUMMARY

Various embodiments of systems and methods are disclosed for using priority information when handling error conditions for a storage resource. In some embodiments, a method involves detecting an error condition, which is associated with a storage resource, and selecting an error-correcting action in response to detection of the error condition. Selection of the error-correcting action is based on priority information. The priority information indicates respective priorities of several sets of data (e.g., by identifying respective priorities of applications that use those sets of data). At least one of the sets of data is stored on the storage resource.

Detecting the error condition involves detecting a conflict between two or more applications. The conflict arises when more than one of the applications is contending for use of a storage resource. The error-correcting action is selected in a way that resolves the conflict in favor of a higher-priority application.

In one embodiment, detecting the error condition involves detecting a failure of an active path in a multipathed storage system that provides active/passive access to a storage device. In such a situation, selection of the error-correction action involves selecting a new active path in the multipathed storage system dependent upon whether the new active path couples the multipathed storage system to a computing device executing a higher-priority application. It is noted that the new active path will not necessarily couple a majority of the computing devices to the multipathed storage system.

In another embodiment, detecting the error condition involves detecting a failure of one or more storage devices, which store application data for one or more applications. Selection of the error-correcting action can involve selecting a first portion of the application data to be recovered prior to recovery of a second portion of the application data, where the first portion of the application data is used by a higher-priority application and the second portion of the application data is used by a lower-priority application. Selection of the error-correcting action can also (or alternatively) involve selecting an additional storage device, in response to the additional storage device storing redundant data for a lower-priority application, and recovering the application data for a higher-priority application on the additional storage device.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Priority information that identifies the relative priorities of several sets of data can be used when handling error conditions involving a storage resource. Based on the priority information, an error-correcting action can be selected such that higher-priority data is favored over lower-priority data. The priority information can indicate the priorities of the sets of data by identifying the relative priorities of applications that access those sets of data. The priority information can be used when handling error conditions involving a storage resource. For example, subsequent to the failure of a storage device that stores application data for multiple applications, the error-correcting action can be selected such that application data for a higher-priority application is restored prior to the recovery of application data for a lower priority application. Similarly, after detecting that a higher-priority application is low on storage space, an error-correcting action can be selected such that the storage space is reallocated from a lower-priority application to the higher-priority application.

In other situations, the priority information directly identifies the priorities of the different sets of data instead of and/or in addition to identifying the priorities of applications that access those sets of data. In such situations, more than one of the sets of data may be used by the same application. For example, the priority information can identify a higher priority for file system metadata than for the data managed by the file system. In this situation, subsequent to the loss of redundancy (e.g., due to the failure of a mirror) of file system metadata, a storage resource used to provide redundancy for the data managed by the file system can be reallocated to provide redundancy for the file system metadata.

As used herein, a storage resource includes storage devices such as storage arrays, hard drives, tape drives, storage jukeboxes, and the like, as well as devices that provide access to such storage devices, such as storage device controllers, storage network devices, and the like. Error conditions are conditions that occur when a storage resource fails or is being used in a non-optimal or undesirable way. Thus, error conditions can include failure conditions as well as other error conditions. Error conditions can occur when a storage resource fails, operates in an undesirable manner, experiences a condition that is detrimental to application performance, experiences a condition that indicates the possibility of a future disruption to application performance, and the like. For example, error conditions can occur when a disk drive fails, when an application exceeds a threshold amount of usage of allocated disk space (indicating that the application may run out of disk space in the near future), or when an active path in a multipathed storage array fails.

When an error condition occurs, it creates a conflict or a potential conflict between multiple applications for resources or between multiple sets of data, having different priorities, that are used by a single application. For example, a storage device can fail, causing a high priority application to lose application data. If there are no spare storage devices available within the system, a conflict for storage space exists between the high priority application and one or more other applications that are currently using storage devices in the system, since the application data for the high priority application will need to be restored on a storage device that is currently in use by another application. Similarly, if application data for multiple applications is lost, and if a storage application can only restore application data for one application at a time, a conflict for processing resources (i.e., the resources needed to restore application data) exists between all of the applications that lost application data. By using priority information when handling error conditions such as these, conflicts between applications can be resolved in favor of higher priority applications.

Figure 1:
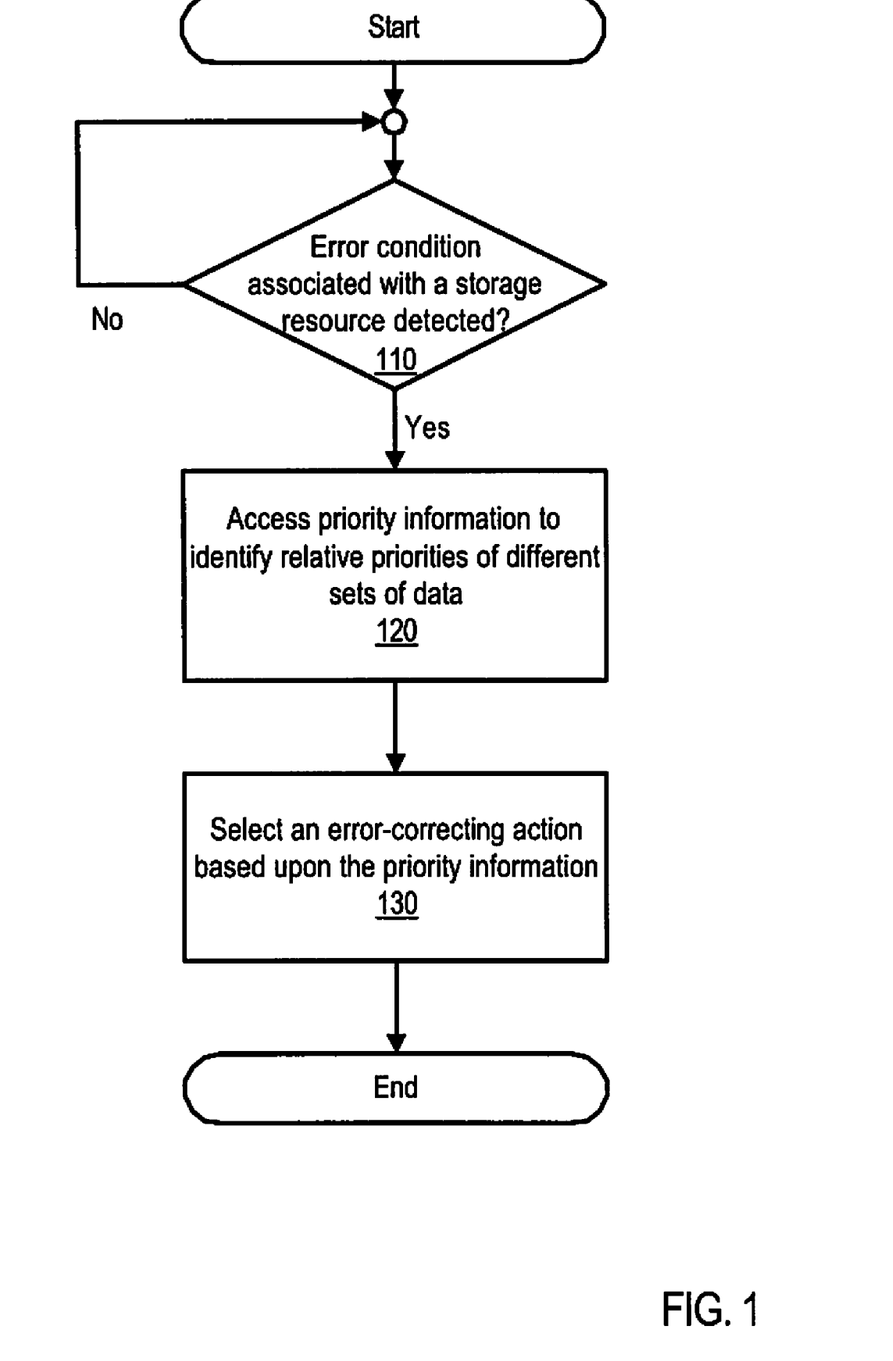
FIG. 1 is a flowchart illustrating one embodiment of a method of using priority information when selecting an error-correction action.

FIG. 1 is a flowchart illustrating a method of using priority information when selecting an error-correction action. The method can be used to handle error conditions, detected at 110, associated with a storage resource.

If an error condition associated with a storage resource is detected, at 110, priority information is accessed, as shown at 120. The priority information indicates the relative priorities of several sets of data that are or can be stored on the storage resource. In some embodiments, the relative priorities of the sets of data are indicated by identifying the relative priorities of applications that use those sets of data. For example, the priority information can identify the priorities of applications that use or can potentially use the disk drive to store application data.

A user (e.g., a system administrator) can select one of the priorities for a set of data and/or for an application when the application is installed and/or configured, and priority information indicating the selected priority can then be maintained for future use in handling error conditions. The priority information can identify the priority of sets of data and/or applications in a variety of ways. For example, in one embodiment, N possible priorities are available (e.g., four priorities 0-3, where 0 represents the lowest priority and 3 represents the highest priority). The priority information stores information identifying the application and/or set of data, as well as information identifying the priority of that application and/or set of data. Alternatively, the priority information can list applications or sets of data in order of priority (e.g., applications at the head of the list are the highest priority applications, while applications at the tail of the list are the lowest priority applications, or vice versa). Other techniques can also be used to identify the relative priorities of each application or set of data. It is noted that several (or even all) applications or sets of data can have the same priority in some situations.

Based on the priority information accessed at 120, an error-correcting action is selected, as indicated at 130. The error-correcting action is selected in such a way that any negative consequences of the error-correcting action will tend to affect lower-priority sets of data rather than higher-priority sets of data. If the priority of different sets of data is based on the priority of the applications that use those sets of data, then the error-correcting action is selected in such a way that any negative affects on application performance or fault tolerance will tend to affect higher-priority applications less than lower-priority applications. For example, if the error condition is caused by the failure of an active path in a multipathed storage array, selection of the error-correcting action involves selecting a new active path. By using the priority information, a path that provides higher-priority applications with access to the storage array can be selected (as opposed to selecting a path that provides lower-priority applications, but not higher priority applications, with access to the storage array).

Figure 2:
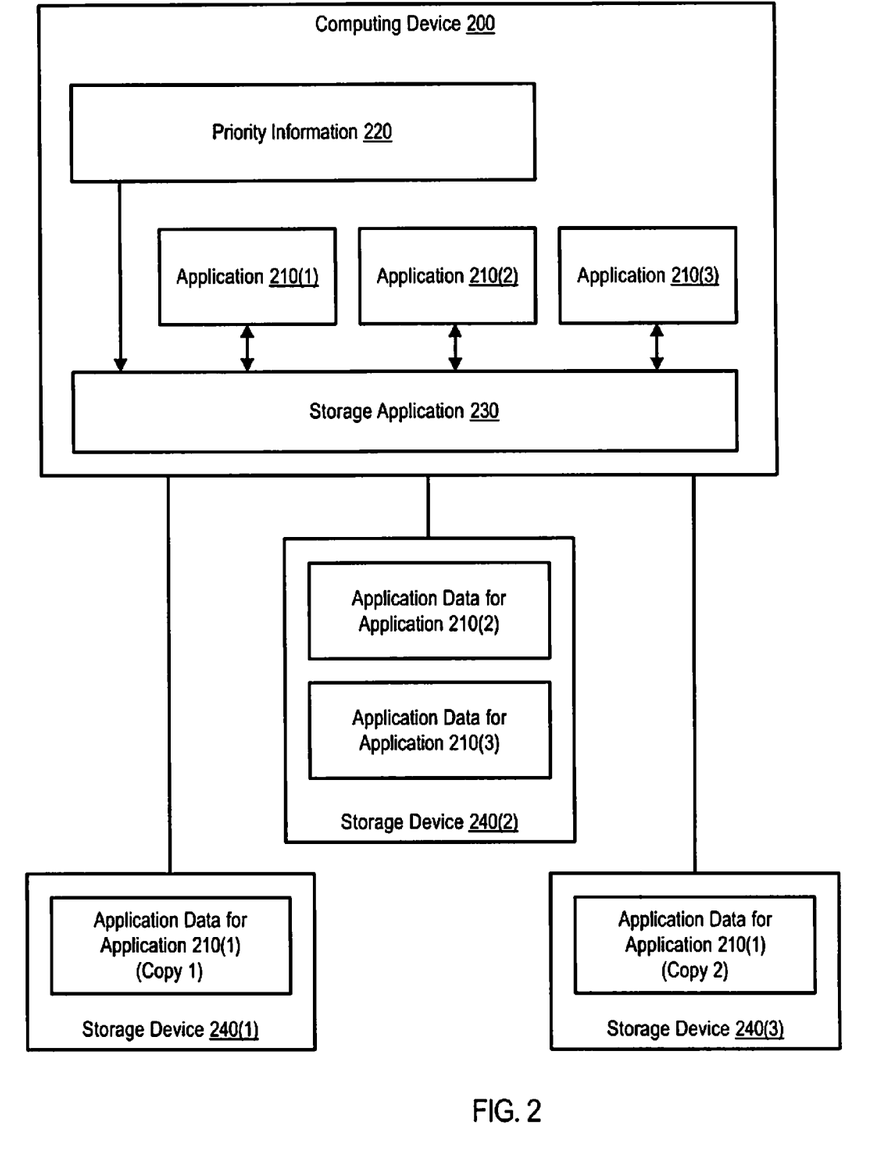
FIG. 2 is a block diagram of a system that maintains and uses priority information, according to one embodiment.

FIG. 2 is a block diagram of a system that maintains and uses priority information, according to one embodiment. In this example, a computing device 200 implements three applications, applications 210(1), 210(2), and 210(3). Computing device 200 stores (e.g., in memory such as RAM (Random Access Memory) and/or on a persistent storage device (not shown)) priority information 220. Computing device 200 also implements a storage application 230. Storage application 230 manages the storage of application data for applications 210(1)-210(3) on storage devices 240(1)-240(3). It is noted that throughout this description, components identified by the same numeral, followed by a unique parenthetical identifier (e.g., applications 210(1)-210(3)) are collectively referred to by that numeral alone (e.g., applications 210).

Application data for application 210(1) is stored on two storage devices, storage device 240(1) and storage device 240(3). Each storage device 240(1) and 240(3) independently stores a copy of the application data for application 210(1), thus providing a level of redundancy. If one of the storage devices 240(1) and 240(2) fails, application 210(1) will still be able to access a copy of the application data on the remaining storage device. Application data for applications 210(2) and 210(3) is stored on storage device 240(2).

Storage application 230 can be one of various applications that control how applications access data that is stored on storage devices 240(1)-240(3). For example, storage application 230 can include a file system and/or a volume manager (i.e., a tool that provides volume virtualization). As another example, storage application 230 can be a database that provides a volume manager and/or a file system. While storage application 230 is shown as a software application that executes on a computing device in FIG. 2, it is noted that storage application 230 can be implemented differently in other embodiments. For example, in one embodiment, storage application 230 executes on a network device (e.g., a switch that provides volume virtualization) or a storage controller (e.g., an array controller). In other embodiments, all or part of the functionality of storage application 230 is implemented in hardware included in such a network device or storage controller.

Storage application 230 is configured to detect one or more error conditions associated with storage devices 240(1)-240(3). In response to an error condition, storage application 230 can perform one or more error-correcting actions. Storage application 230 can use priority information 220 to determine which error-correcting action to perform and/or how to perform one or more error-correcting actions.

A variety of error conditions can occur in the system of FIG. 2. For example, the amount of application data for application 210(1) that is stored on storage device 240(1) can exceed a threshold amount, indicating that application 210(1) is in danger of running out of space on storage device 240(1) in which to store application data. Similarly, one of the storage devices can fail, causing one or more of applications 210(1)-210(3) to lose access to the application data stored on that storage device. If storage device 240(2) fails, for example, an error condition occurs in which application data for both application 210(2) and 210(3) is lost.

Another example of an error condition occurs when redundant copies (e.g., mirrors) of an application's application data are maintained. If the storage device that stores one copy of the application data fails, the application will still have access to the application data. However, due to the failure, the application data will be more vulnerable, due to a reduction in redundancy level. For example, if storage device 240(3) fails, one copy of application data for application 210(1) will be lost. While application 210(1) will still have access to a copy of the application data (on storage device 240(1), the application data is now vulnerable to failure (i.e., if storage device 240(1) fails, application 210(1) will not have access to the application data). Thus, an error condition indicating a drop in redundancy level occurs when storage device 240(3) fails.

Storage devices 240(1) and 240(2) can each be physical or virtual devices. For example, in one embodiment, storage devices 240(1) and 240(2) are each physical storage arrays. Alternatively, each storage device can be a single disk drive. In another embodiment, storage devices 240(1) and 240(2) are logical volumes, and each volume can employ some sort of redundancy and/or storage aggregation (e.g., through mirroring or the use of other RAID techniques involving striping and parity).

Figure 3:
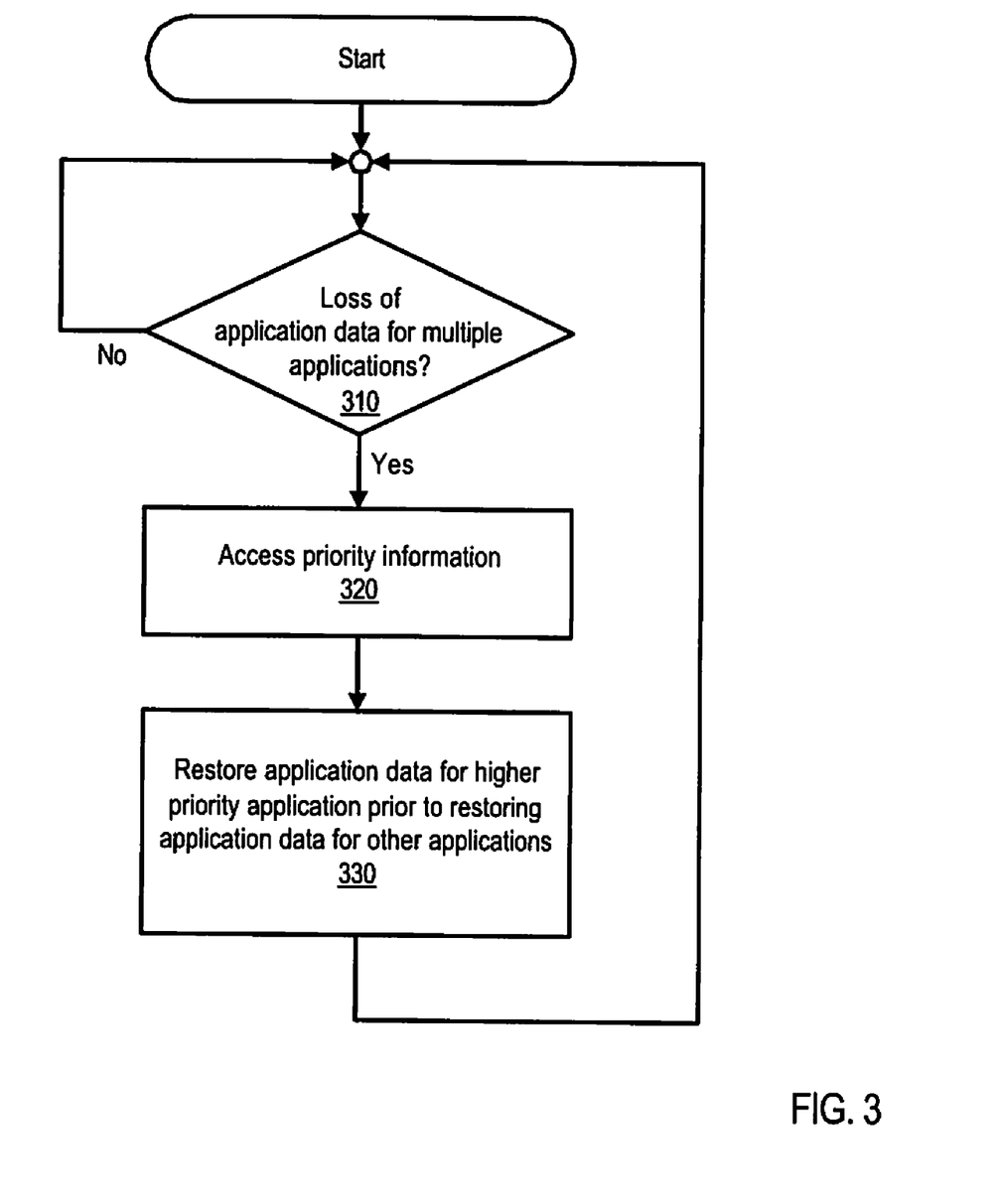
FIG. 3 is a flowchart of one embodiment of a method of using priority information when handling an error condition that arises when application data for more than one application is lost.

FIG. 3 is a flowchart of a method of using priority information when handling an error condition that arises when application data for more than one application is lost. In this example, the error condition occurs when application data for more than one application is lost. Such an error condition can occur due to the failure of one or more of various storage resources (e.g., disk drives, array controllers, storage area network switches, and the like) that either store the application data or provide the application with the ability to access the application data. As a result of the error condition, the applications may be unable to access the application data (alternatively, the applications may experience a drop in redundancy level due to loss of a mirror).

As shown at 310, the error condition is detected. For example, a storage application can detect an error condition by monitoring a storage resource and/or one or more applications for signals, error messages, semaphores, or other indications of an error condition. The error condition detected at 310 occurs when application data for multiple applications is lost or compromised due to a drop in redundancy level. Since application data for more than one application has been lost or compromised, a conflict for resources exists if application data can only be restored one application at a time.

In response to detection of the error condition, priority information is accessed, as shown at 320. In this example, the priority information identifies the relative priorities of at least some of the applications that lost application data due to the error condition detected at 310.

Based on the priority information accessed at 320, the relative priorities of at least some of the applications that lost application data (or experienced a drop in redundancy level) can be identified. For example, in one embodiment, three priorities 1-3 are supported, with 3 representing the lowest priority and 1 representing the highest priority. If application data for two applications A and B is lost or compromised (e.g., due to a drop in redundancy level) due to a disk drive failure, the priority information can be accessed to determine the relative priorities of applications A and B. If the priority information associates application A with priority 3 and application B with priority 2, it can be determined that application B is a higher priority application than application A.

The application data that was lost or compromised due to the error condition can be restored, allowing the applications to resume operations and/or restoring a desired level of redundancy. Restoration of the application data can be accomplished in a variety of different ways, including creating a new copy (from one or more remaining copies on non-failed storage devices) of the application data on the failed storage device or a replacement storage device and/or restoring the application data to the failed storage resource (or a replacement storage resource) from a backup copy or mirror.

As shown at 330, the application data for a higher priority application is restored prior to the restoration of application data for other applications. Thus, higher priority applications will be able to resume normal operation prior to the other applications. Accordingly, an improved level of service, relative to lower priority applications, can be provided for the higher priority application(s).

It is noted that some of the applications that lost application data may not be identified in the priority information (e.g., priorities may not be assigned to certain applications). In one embodiment, such situations are handled by restoring application data for applications that are identified in priority information prior to restoring application data for applications that are not identified. Other embodiments may handle such situations differently.

The method of FIG. 3 can be implemented in the system of FIG. 2. For example, if storage device 240(2) of FIG. 2 experiences a failure, both application 210(2) and application 210(3) may lose access to application data stored on storage device 240(2). Storage application 230 detects this error condition and accesses priority information 220. If, for example, priority information 220 indicates that application 210(3) has a higher priority than application 210(2), storage application 230 can initiate restoration of application data for application 210(3) prior to initiating restoration of application data for application 210(2).

Figure 4:
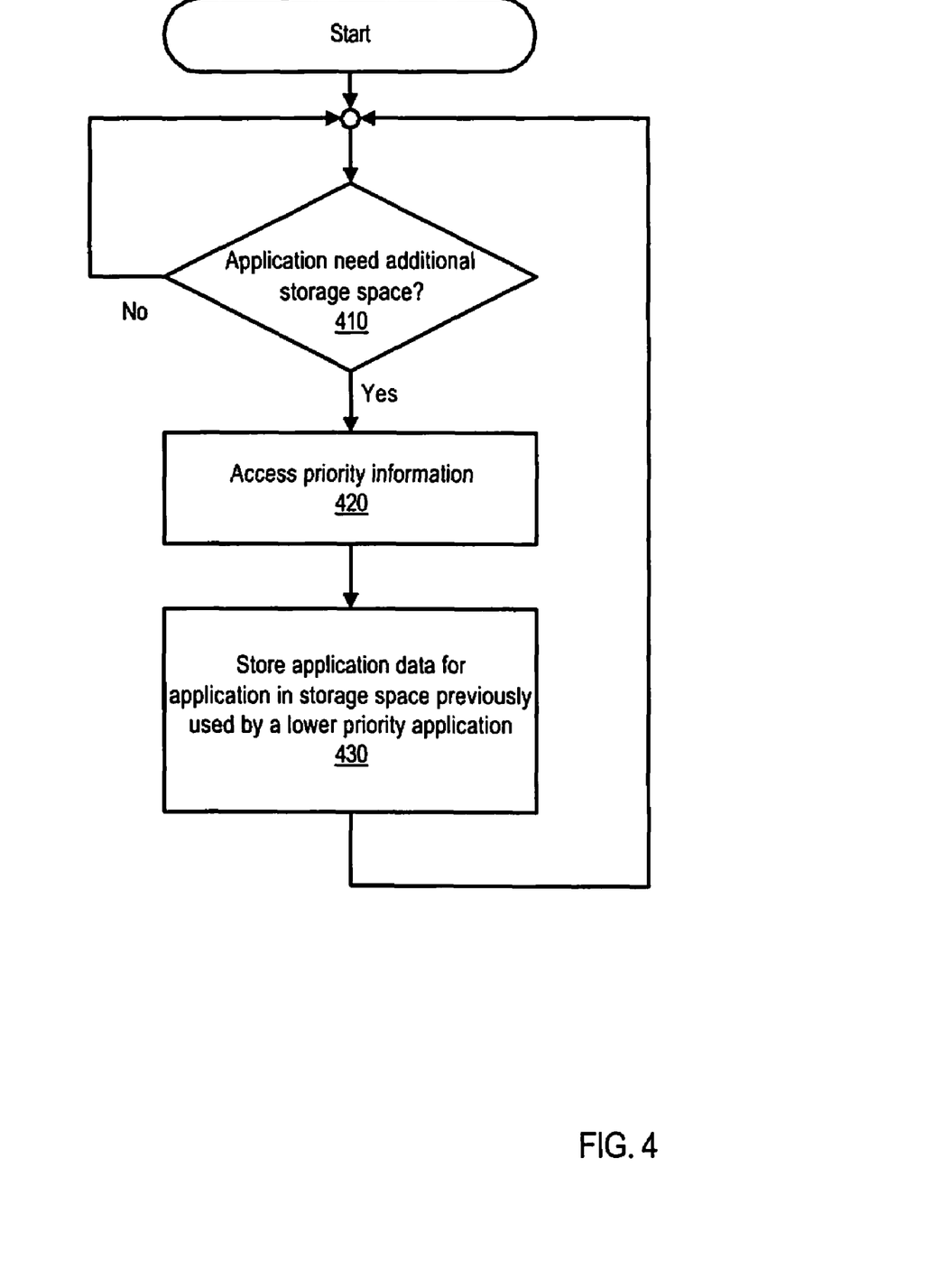
FIG. 4 is a flowchart of one embodiment of a method of using priority information when handling an error condition that arises when an application needs additional storage space in which to store application data.

FIG. 4 is a flowchart of a method of using priority information when handling an error condition that arises when an application needs additional storage space in which to store application data. This error condition can arise when the amount of space used to store application data on a particular storage device exceeds a certain amount (or when the amount of free space on a particular storage device decreases beneath a certain amount), indicating that the application is likely to soon run out of space for storing application data.

At 410, the error condition is detected by detecting that an application needs (or will need at some point in the future) additional storage space. This error condition indicates that a potential conflict exists between applications. For example, if there are no spare storage devices available to allocate to the application, but a storage device currently used by another application could be reallocated, a conflict exists between the applications for that storage device.

In response to detecting this error condition, priority information is accessed, as shown at 420. The priority information can indicate the priority of the application and/or the priorities of one or more other applications.

If there are no free storage resources to allocate to the application, the priority information can be used to identify lower priority resources, if any, relative to the application. If there are any lower priority applications, storage space(s) currently being used by one or more of those lower priority applications can be reallocated to the application, as shown at 430. Thus, by reallocating storage space from a lower priority application to a higher priority application, a conflict for storage resources can be resolved in favor of the higher priority application.

In some embodiments, the error condition is detected (at 410) when a file system is running low on storage space. For example, the error condition can be detected for a file system, FS A, which manages application data for several other applications. The priority information can indicate the priorities of the applications whose application data is managed by the file system FS A, as well as the priorities of other applications whose application data is managed by another application, App B. Redundant data (e.g., a mirror) of the application data used by the other application App B is stored on a storage device. If the priority information indicates that the other application App B has a lower priority than the file system FS A, the storage device can be reallocated to the file system FS A. Thus, as this example shows, the priority information can identify priorities of applications other than the application for which the error condition is detected.

It is noted that in some embodiments, storage space is considered as a candidate for reallocation if that storage space is used to store redundant data for the lower priority application. For example, function 430 can be performed by reallocating storage space used to store one of several mirrors for the lower priority application. After the reallocation, the lower priority application will still be able to access a copy of its application data on another mirror; however, the lower priority application will experience a reduced level of redundancy. By selecting to reallocate space used to store redundant data for the lower priority application, the reallocation can be performed without causing the lower priority application to lose access to its application data.

The method of FIG. 4 can be implemented in the system of FIG. 2. For example, the amount of application data for application 210(2) on storage device 240(2) can exceed a threshold amount. Storage application 230 can detect this error condition. If no other storage devices are free to be allocated to application 210(2), storage application 230 can access priority information 220 in order to see whether storage can be obtained from a lower priority application. Priority information 220 can indicate that application 210(2) has a higher priority than application 210(1). Since application 210(2) has a higher priority than the application 210(1), and since application 210(1) currently stores redundant data, storage application 230 can reallocate all or part of storage device 240(1) (or alternatively, storage device 240(3)) for use by application 210(2). After the reallocation, a redundant copy of application data for application 210(1) will no longer be available (i.e., only one copy of the application data for application 210(1) will be available after the reallocation).

It is noted that a method similar to the method of FIG. 4 can be performed when a conflict arises between different sets of data used by the same application. For example, if a file system is running low on space in which to store (or provide redundancy for) file system metadata, the priority information can be accessed to determine if additional storage space can be reallocated from a lower priority set of data to the file system metadata. The priority information can identify the priorities of the file system metadata relative to the data managed by the file system (e.g., the metadata can have a higher priority than the data), as well as the priorities of one or more sets of data used by other applications. Based on the priority information, storage space used to store lower priority data can be identified and reallocated to the file system metadata.

Figure 5:
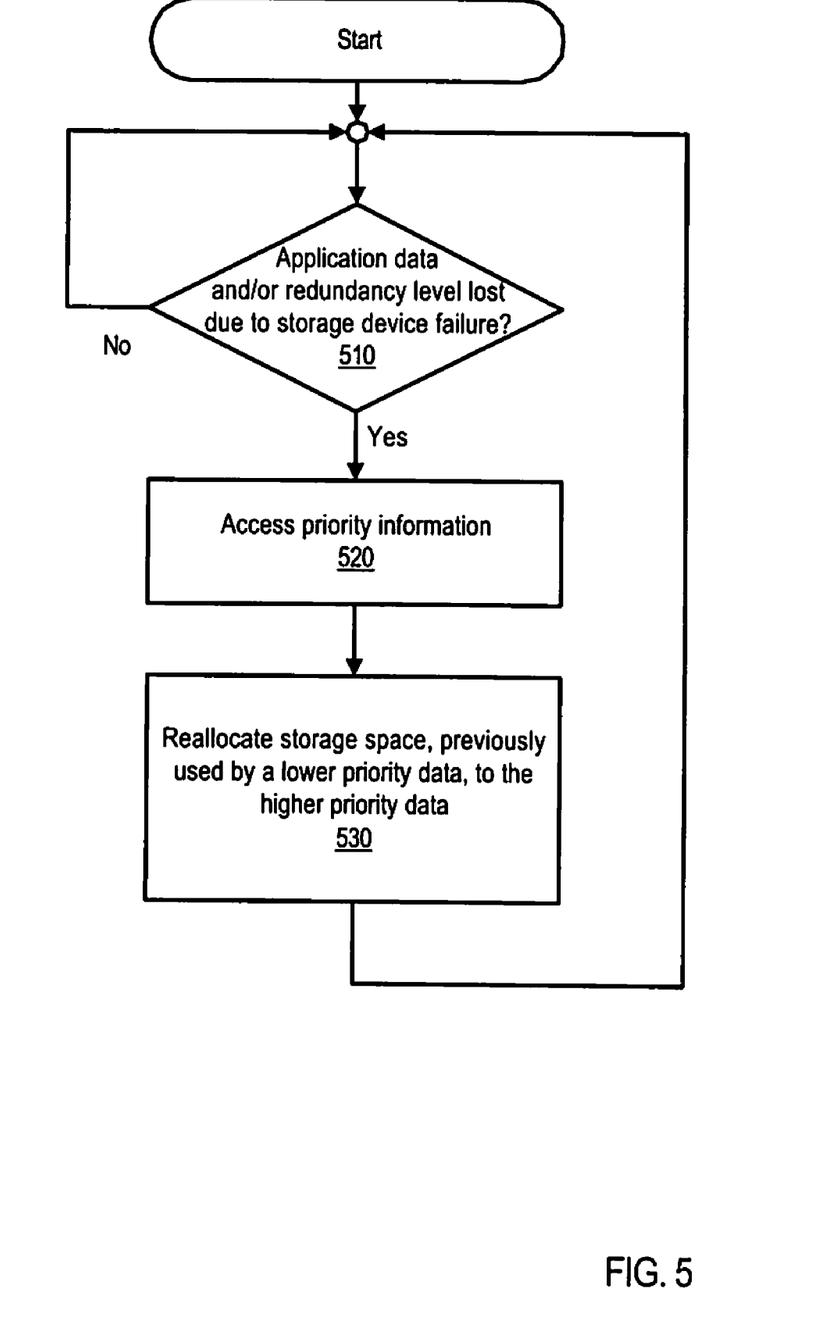
FIG. 5 is a flowchart of one embodiment of a method of using priority information when handling an error condition that arises when a storage device fails.

FIG. 5 is a flowchart of a method of handling an error condition that arises when a storage device fails. At 510, the error condition, which occurs when an application loses data or experiences a reduction in redundancy level due to a storage device failure, is detected. If there is no spare storage space in the system that can be used to restore the application data and/or desired redundancy level for the application, storage space currently used by another application will need to be reallocated. Accordingly, detecting of the error condition can indicate that a conflict exists between applications for storage space.

If the error condition is detected at 510, priority information is accessed at 520 (performance of function 520 can be similar to performance of functions 320 and 420 in FIGS. 3 and 4 respectively). In this example, the priority information indicates the priority of the application as well as the priorities of one or more other applications. As shown at 530, based on the priority information, storage space used by a lower priority application can be reallocated to the application that experienced the error condition at 510. In some embodiments, storage space is eligible to be reallocated if that storage space is used to store a redundant copy of application data for a lower priority application. For example, a storage device that is used to store a mirror for the lower priority application can be reallocated to a higher priority application.

While the above examples have shown error conditions that can arise in a single-node system, it is noted that similar error conditions can arise in multi-node systems. For example, instead of multiple applications executing on a single computing device, each application can execute on a different computing device. Conflicts between the applications can arise in the same ways described above. Priority information can be shared among the nodes (e.g., by storing the priority information on a storage device accessible by all nodes and/or by communicating updates to the priority information among the nodes), such that all nodes have access to the same copy of the priority information.

Figure 6:
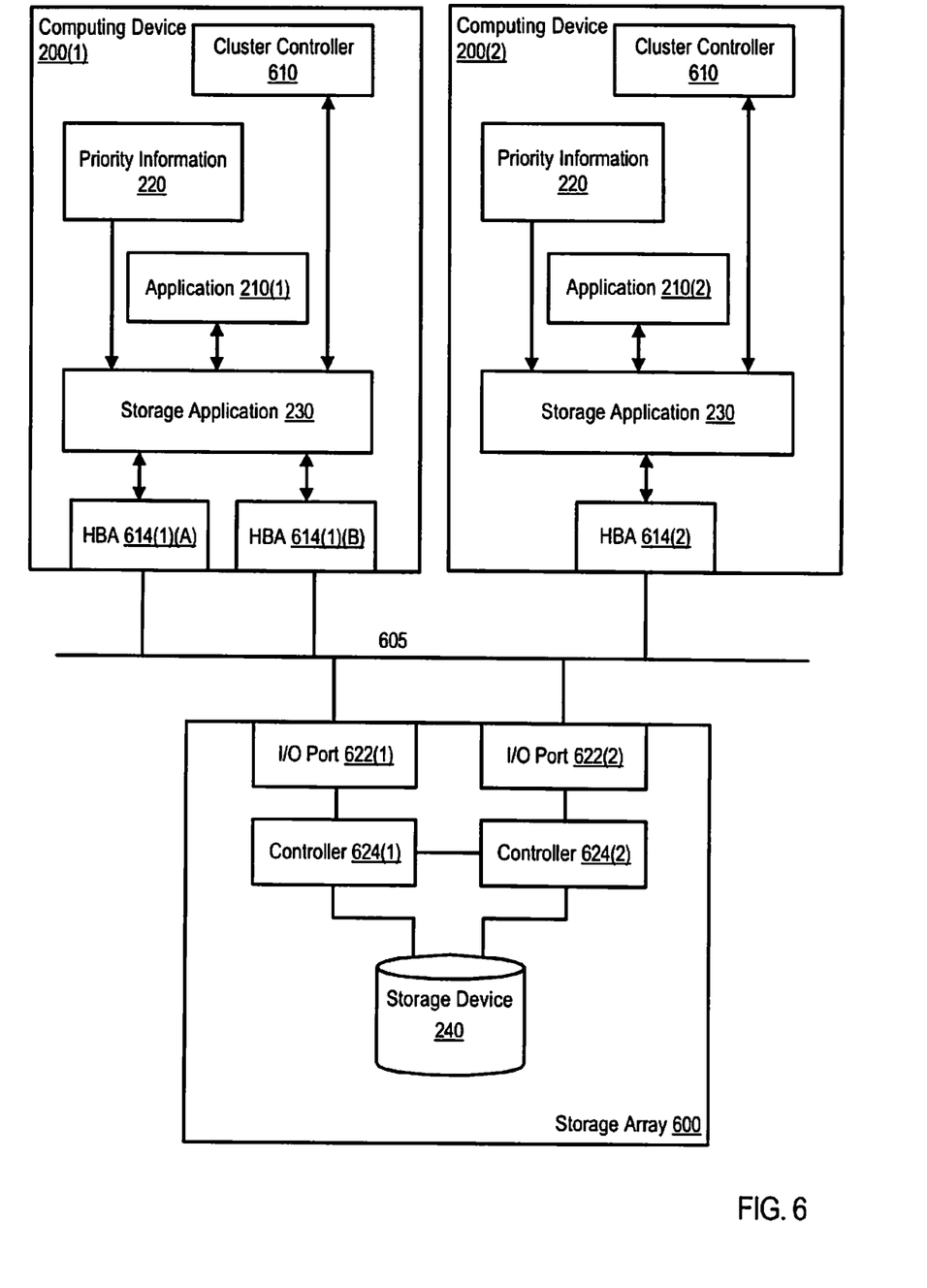
FIG. 6 is a block diagram of a multi-node system that maintains and uses priority information, according to one embodiment of the present invention.

FIG. 6 is a block diagram of a multi-node system that maintains and uses priority information. In this example, two computing devices 200(1) and 200(2) are coupled to a shared storage array 600 by an interconnect 605. A variety of different types of interconnects can be used to couple computing devices 200 to storage array 600. For example, interconnect 605 is a Fiber Channel network used to implement a SAN (Storage Area Network) in some embodiments. In other embodiments, interconnect 605 is implemented using direct connections between computing devices 200 and storage array 600. In yet other embodiments, interconnect 605 is an IP (Internet Protocol) network.

Computing devices 200(1) and 200(2) each execute software that implements a cluster controller 610. Computing devices 200(1) and 200(2) also execute software that implements one or more applications. In this example, computing device 200(1) executes software that implements application 210(1) and storage application 230. Computing device 200(2) executes software that implements application 210(2) and storage application 230. Storage application 230 provides applications 210(1) and 210(2) with access to application data stored on storage device 240. Storage application 230 is configured to detect error conditions associated with storage array 600 and, in response, to perform one or more error-correcting actions based on priority information 220.

In this example, computing devices 200 each execute an instance of storage application 230. Cluster controller 610 can allow storage application 230 and/or one or both of applications 210(1) or 210(2) to be operated as a clustered application.

Computing device 200(1) includes Host Bus Adapter (HBA) 614(1)(A), and HBA 614(1)(B). Similarly, computing device 200(2) includes HBA 614(2). Each HBA can be a logical adapter (e.g., HBAs 614(1)(A) and 614(1)(B) can be logical adapters implemented on the same physical network interface card) or a physical adapter. In alternative embodiments, instead of including multiple HBAs, a computing device can include a single, multi-ported HBA.

Storage array 600 is a multi-ported storage array that includes I/O port 622(1), I/O port 622(2), controller 624(1), controller 624(2), and storage device 240 (it is noted that several additional storage devices will typically also be included in storage array 600, but for simplicity, only a single such device is illustrated). I/O ports 622(1) and 622(2) communicate I/O commands and data via interconnect 605. One of the controllers 624(1) and 624(2) is associated with each I/O port 622(1) and 622(2), and each controller generally handles I/O commands addressed to storage device 240 that are received via the associated I/O port. For example, controller 624(1) handles I/O commands received via I/O port 622(1), and controller 624(2) handles I/O commands received via I/O port 622(2). Controllers 624(1) and 624(2) are connected so that they can coordinate failovers and/or coordinate the values of various information (e.g., controllers 624(1) and 624(2) can coordinate the contents of their caches in some embodiments).

In this example, storage device 240 includes one or more storage devices, such as disk drives, that are each accessible by both controllers 624(1) and 624(2). In some embodiments, storage device 240 is a virtualized device. For example, storage application 230 can be virtualization software, such as VERITAS Volume Manager (TM), available from VERITAS Software Corp, of Mountain View, Calif., that allows several storage devices, or a portion of each of several storage devices, to be treated as a single logical entity, and storage device 240 can be one of those logical entities. Alternatively, controllers 624(1) and 624(2) provide a similar virtualized representation of storage device 240 to applications executing on computing devices 200 in some embodiments.

Since computing device 200(1) includes two HBAs, one HBA 614(1)(A) can be configured to access storage array 600 via a first path that passes through controller 624(1) while another HBA 614(1)(B) can be configured to access storage array 600 via a second path that passes through controller 624(2). In contrast, computing device 200(1) only includes one HBA 660(2), which is configured to access storage array 600 via a single path that passes through controller 624(1). Thus, as shown in FIG. 6, while multiple computing devices can share access to a multipathed storage array such as storage array 600, those computing devices may not all have access to the multipathed storage array via the same paths. It is noted that many other configurations that provide non-uniform access to a multipathed array are possible.

The path(s) (as defined by a controller such as controller 624(1) or controller 624(2)) via which computing devices 200 are currently accessing storage device 240 is referred to as the active path(s), while the unused path(s) are referred to as the passive path(s). The controller through which the active path passes is referred to as the active controller. In many situations (e.g., such as those where controllers 624 implement auto-trespass or auto-failover capabilities), it is desirable for all devices accessing storage array 600 to use the same active path(s) at a given time, such that only one controller 624 is active at a time. Such a storage array configuration is referred to as an "active/passive" configuration.

Computing devices, such as computing device 200(1), that can access storage array 600 via more than one path can use storage application 230 to take advantage of the fact that storage array 600 has more than one I/O port. In the event of a loss of connectivity to storage device 240 via one path, storage application 230 selects another path to the storage device. For example, if storage application 230 detects an error condition when computing device 200(1) is accessing storage device 240 via the path that passes through controller 624(1), storage application 230 automatically reroutes I/O operations to storage device 240 over the alternative path, which passes through controller 624(2). Storage application 230 can detect an error condition due to a path failure by detecting a variety of different errors, including device-level errors (e.g., SCSI errors or timeouts) as well as interconnect-level errors (e.g., fabric login errors).

Thus, in response to an error condition indicative of a path failure, an instance of storage application 230 can perform an error-correcting action that involves selecting a new path to use when accessing storage array 600. Before storage application 230 begins using a path that passes through a different controller 624, storage application 230 accesses priority information 220. In this example, priority information 220 indicates the relative priorities of applications executing on each computing device 200(1) and 200(2). For example, priority information may indicate that application 210(2) is a higher-priority application than application 210(1).

Based on priority information 220, storage application 230 can select a new path, if any, that will provide the highest priority applications with continued access to storage array 600. For example, if the path that passes through controller 624(1) is currently the active path, the instance of storage application 230 executing on computing device 200(1) can detect that HBA 614(1)(A) has experienced a failure, and thus computing device 200(1) is no longer able to access storage array 600 via the active path. However, application 210(2) on computing device 200(2) is still able to access storage array 500 via a path that passes through controller 624(1). Furthermore, as noted above, computing devices 200(1) and 200(2) are not able access to storage array 600 via the same paths, since computing device 200(2) cannot access the storage array 600 via the path that passes through controller 624(2).

In this situation, storage application 230 can use priority information 220 to select a new path (or set of paths, which pass through the same controller), while also preferring higher-priority applications in the path selection process. Thus, if application 210(2) is the highest-priority application, a path passing through controller 624(1) should be selected as the new active path, since HBA 614(2) of computing device 200(2) can only access storage array 600 via controller 624(1). In this situation, application 210(1) will no longer be able to access application data stored on storage array 600 subsequent to the failure of HBA 614(1)(A) and the selection of the path passing through controller 624(1).

If instead priority information 220 indicates that application 210(2) is the highest priority application, a path that passes through controller 624(2) should be selected (due to the failure of HBA 614(1)(A), HBA 614(1)(B) is the only working HBA via which application 210(1) can access storage array 600, and HBA 614(2)(A) is configured to access storage array 600 via controller 624(2)). In this situation, once storage application 230 begins using the selected path, controller 624(2) will become the active controller. Accordingly, at this point, application 210(2) will no longer be able to access application data on storage array 600, since computing device 200(2) is only able to access storage array 600 via the path that passes through controller 624(1). It is noted that as part of the process of selecting a new path, an instance of storage application 230 can also coordinate the path selection with the other instance(s) of storage application 230, such that all of the instances of the storage application will begin using paths that pass through the same controller (since only one controller should be active at a time).

As noted above, there can be many configurations that, like the configuration of FIG. 6, provide different applications with non-uniform access to a multipathed storage array (access is non-uniform in that some applications can access the multipathed storage array via paths that are not usable by other applications). While FIG. 6 shows only two applications, each executing on a different computing device, other scenarios can include more than two applications and/or computing devices. In such situations, path selection can involve selecting the path (or set of paths) that provides the most high priority applications with continued access to the storage array. If there are multiple tiers of priority, path selection can involve selecting a path (or set of paths) that provide the greatest number of highest priority applications with continued access to the storage array. If there are multiple paths (or sets of paths) that provide access to the same number of the highest priority applications, path selection can also take the next-highest priority applications into account, and so on. By using priority information in the path selection process, higher priority applications are less likely to be disrupted during failover situations in which a new active path (or set of active paths) is selected. It is noted that using priority information differs from typical path selection techniques, which typically operate by selecting a path (or set of paths) that provide the most computing devices (without regard to the priority of applications executing on those computing devices) with access to the storage array.

It is noted that in some embodiments, priority information 220 is maintained by cluster controllers 610 (e.g., in a file or database). In such embodiments, storage application 230 can access priority information 220 by communicating with cluster controller 610 and/or accessing a file or database maintained by cluster controller 610. Alternatively, priority information 220 can be provided and maintained by a user (e.g., a system administrator). In still other embodiments, storage application 230 maintains priority information 220.

While the example of FIG. 6 shows a multipathed storage array in which array controllers in the storage array define the active path, it is noted that in other embodiments, the active path can be defined differently. In some embodiments, network devices (e.g., switches in a storage area network) can also be used to provide multipathed access to a storage device. For example, two virtualizing switches (switches that also provide volume virtualization) can each be configured to present the same virtualized volume to several storage clients. In such a situation, paths are defined relative to the virtualizing switches, such that the active path (or set of active paths) pass through the active virtualizing switch, and the passive path (or set of passive paths) pass through the passive virtualizing switch. Additionally, while the example of FIG. 6 showed how two controllers can be used to provide multipathed access to a storage array, it is noted that more than two controllers can be used in other embodiments.

Figure 7:
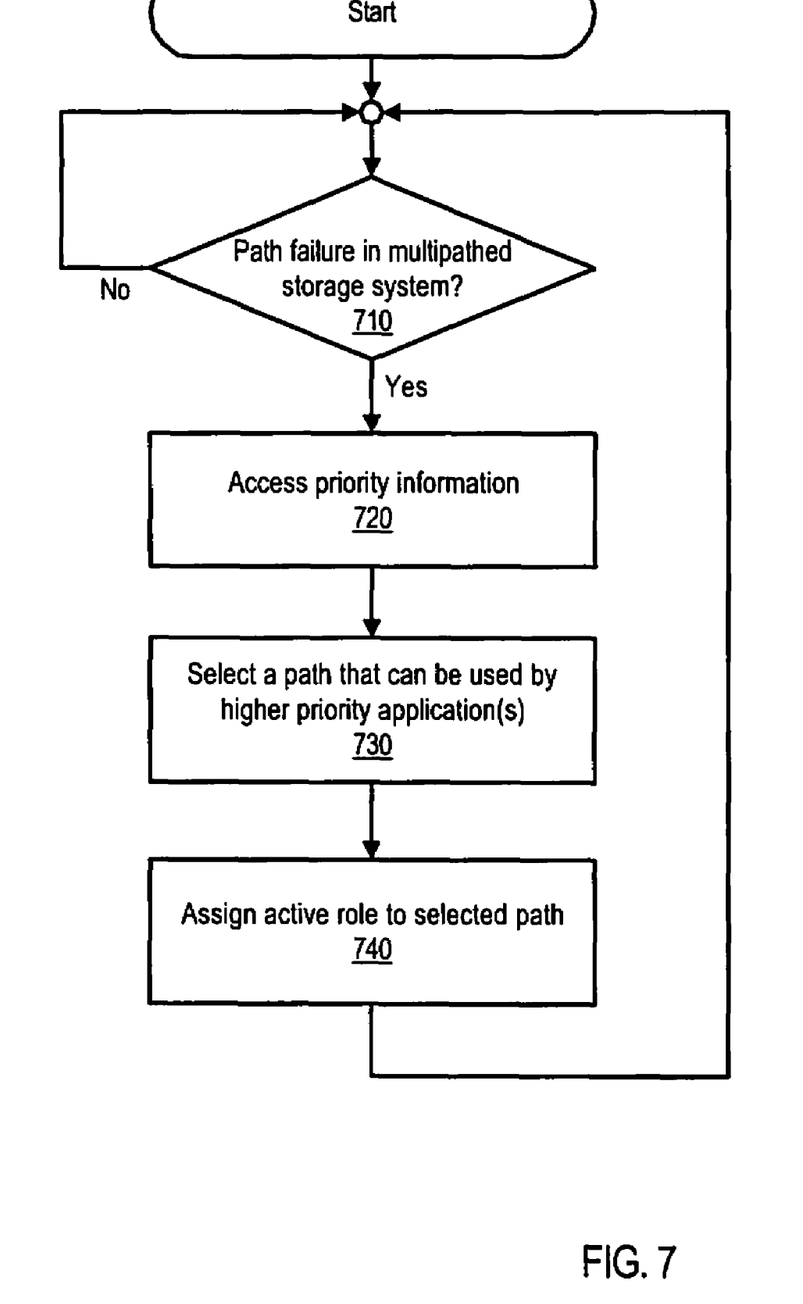
FIG. 7 is a flowchart of one embodiment of a method of using priority information when handling an error condition that arises when an active path within a multipathed storage array fails.

FIG. 7 is a flowchart of a method of using priority information when handling an error condition that arises when a path used to access a multipathed storage device (e.g., such as storage array 600 of FIG. 6) fails. It is noted that the method of FIG. 7 can be performed by storage application 230 of FIG. 6.

At 710, an error condition corresponding to a path failure can be detected, as described above. If no path failure is detected, the process continues to monitor for path failures.

In response to detection of a path failure, priority information is accessed, as shown at 720. Based on the priority information, a path (or set of paths, if there are multiple paths that can be accessed via the same array controller, network device, or other component) is selected, as shown at 730. The selected path is the path that provides the greatest number of the highest priority applications with access to the multipathed storage device. The selected path is then used to access the multipathed storage device, at 740.

It is noted that the ability of some applications to access the multipathed storage device may be disrupted subsequent to the use of the selected path. For example, if a new active path (or set of active paths) is selected, a new array controller or network device may become the active array controller or active network device. Some applications may be executing on computing devices that are no longer able to access the multipathed storage device via the new active controller or the new active network device, and those applications access to their application data will consequentially be disrupted. However, by using priority information when selecting a path, the likelihood of a high priority application's access being disrupted can be reduced.

Figure 8:
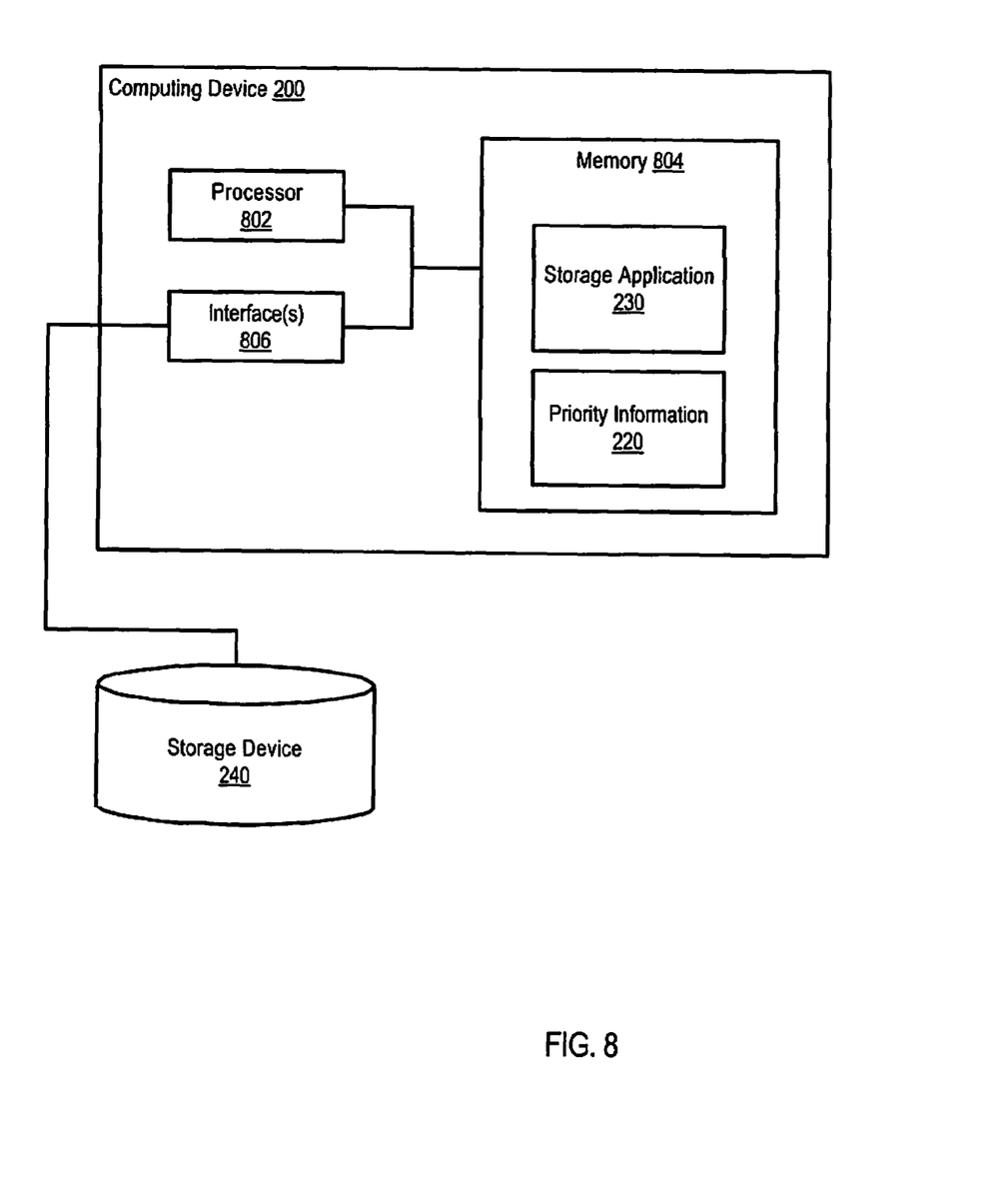
FIG. 8 is a block diagram of a computer system that maintains priority information for use when handling an error condition associated with a storage resource, according to one embodiment of the present invention.

FIG. 8 illustrates how a storage application, which uses priority information (e.g., by implementing one or more of the methods shown in FIGS. 1, 3, 4, 5, and 7) when determining how to handle an error condition associated with a storage resource, can be implemented in software in some embodiments. Here, computing device 200 includes one or more processors 802, memory 804, and one or more interface(s) 806, which are coupled by a bus or other interconnect. Computing device 200 can be a workstation, personal computer, server, PDA (Personal Digital Assistant), cell phone, storage network switch, storage device, storage array controller, or any other device configured to execute and/or implement the functionality of storage application 230. Processor 802 can be a microprocessor, Programmable Logic Device (PLD), Application Specific Integrated Circuit (ASIC), or other device configured to execute program instructions stored in memory 804. Memory 804 can include various types of RAM (Random Access Memory), ROM (Read Only Memory), Flash memory, MEMS (Micro Electro-Mechanical Systems) memory, and the like. Interface(s) 806 can include one or more network interfaces that allow various programs executing on computing device 200 to send and receive information via a network (e.g., interfaces 806 can include one or more HBAs 614 of FIG. 6). Interface(s) 806 can also include interfaces to various peripherals (e.g., such as storage devices 240 of FIG. 1).

Instructions and data implementing storage application 230 and priority information 220 are stored in memory 804 for execution by processor 802. Storage application 230 is configured to detect an error condition associated with a storage resource and, in response to the error condition, access priority information 220 in order to determine how to handle the error condition.

It is noted that in alternative embodiments, storage application 230 is implemented in hardware or in a combination of hardware and software instead of being implemented in software. For example, storage application 230 can be implemented in an ASIC configured to perform the same functions as the program instructions shown in FIG. 8.

The program instructions and data implementing storage application 230 and priority information 220 can be stored on various computer readable media such as memory 804. In some embodiments, such software is stored on a computer readable medium such as a CD (Compact Disc), DVD (Digital Versatile Disc), hard disk, optical disk, tape device, floppy disk, and the like). In order be executed by processor 802, the instructions and data implementing storage application 230 and priority information 220 are loaded into memory 804 from the other computer readable medium. The instructions and/or data can also be transferred to computing device 200 for storage in memory 804 via a network such as the Internet or upon a carrier medium. In some embodiments, a computer readable medium is a carrier medium such as a network and/or a wireless link upon which signals such as electrical, electromagnetic, or digital signals, on which the data and/or instructions implementing storage application 230 and/or priority information 220 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
   detecting an error condition,
      wherein the error condition is associated with a storage resource, and
      wherein an application uses the storage resource to access application data; and
   selecting an error-correcting action, in response to detection of the error condition,
      wherein the selecting the error-correcting action is based on priority information,
      wherein the priority information indicates respective priorities of a plurality of applications, and
      wherein the plurality of applications comprises the application.

2. The method of claim 1, wherein
   the error condition creates a conflict between one or more of the applications,
   the conflict arises when more than one of the applications are contending for use of the storage resource, and
   the selecting the error-correcting action resolves the conflict in favor of a higher-priority application of the applications.

3. The method of claim 1, wherein the detecting the error condition comprises:
   detecting a failure of an active path in a multipathed storage system, wherein the multipathed storage system provides active/passive access.

4. The method of claim 3, wherein the selecting the error-correction action comprises:
   selecting a new path in the multipathed storage system, wherein the selecting the new path is dependent upon whether the new path couples the multipathed storage system to a computing device executing a higher-priority application; and
   assigning an active role to the new path.

5. The method of claim 4, wherein
   a cluster comprises a plurality of computing devices, the computing devices comprising the computing device; and
   the new path does not couple a majority of the computing devices to the multipathed storage system.

6. The method of claim 1, wherein the detecting the error condition comprises:
  detecting a failure of one or more storage devices.

7. The method of claim 6, wherein
  the one or more storage devices store application data for more than one of the applications, and
  the method further comprises selecting a first portion of the application data to be recovered prior to recovery of a second portion of the application data,
    wherein
      the first portion of the application data is used by a higher-priority application of the applications, and
      the second portion of the application data is used by a lower-priority application of the applications.

8. The method of claim 6, wherein the selecting the error-correcting action comprises:
  selecting an additional one of a plurality of storage devices, wherein the additional one of the storage devices stores redundant data for a lower-priority application prior to being selected; and
  recovering application data for a higher-priority application on the additional one of the storage devices.

9. The method of claim 8, wherein
  the failure of the one of the storage devices causes a decrease in a redundancy level of the higher-priority application; and
  the recovering application data for the higher-priority application on the additional one of the storage devices restores the redundancy level of the higher-priority application.

10. The method of claim 1, wherein
  the detecting the error condition comprises detecting that an amount of available storage space for use by a first file system is less than a threshold amount,
  the first file system manages application data for a first application of the applications,
  the priority information indicates that the first application is a higher-priority application,
  the selecting the error-correcting action comprises selecting a storage device to allocate to the file system,
  the storage device stores redundant data for a second application, and
  the priority information indicates that the second application is a lower-priority application.

11. A system comprising:
  means for detecting an error condition,
    wherein the error condition is associated with a storage resource, and
    wherein an application uses the storage resource to access application data; and
  means for selecting an error-correcting action, in response to detection of the error condition,
    wherein the selecting the error-correcting action is based on priority information,
    wherein the priority information indicates respective priorities of a plurality of applications, and
    wherein the plurality of applications comprises the application.

12. A system comprising:
  a processor; and
  a memory coupled to the processor, wherein the memory stores program instructions executable by the processor to:
    detect an error condition,
      wherein the error condition is associated with a storage resource, and
      wherein an application uses the storage resource to access application data; and
    select an error-correcting action, in response to detection of the error condition,
      wherein selection of the error-correcting action is based on priority information,
      wherein the priority information indicates respective priorities of a plurality of applications, and
    wherein the plurality of applications comprises the application.

13. The system of claim 12, wherein
  the error condition creates a conflict between a plurality of applications,
  the conflict arises when more than one of the applications are contending for use of a storage resource, and
  selection of the error-correcting action resolves the conflict in favor of a higher-priority application of the applications.

14. The system of claim 12, wherein
  detection of the error condition comprises detection of a failure of an active path in a multipathed storage system,
  the multipathed storage system provides active/passive access, and
  selection of the error-correction action comprises:
    selection of a new path in the multipathed storage system, wherein
      the selecting the new path is dependent upon whether the new path couples the multipathed storage system to a computing device executing a higher-priority application; and
    assignment of an active role to the new path.

15. The system of claim 12, wherein
  detection of the error condition comprises detection of a failure of one or more storage devices,
  the one or more storage devices store application data for more than one of the applications,
  selection of the error-correcting action comprises selection of a first portion of the application data to be recovered prior to recovery of a second portion of the application data,
  the first portion of the application data is used by a higher-priority application of the applications, and
  the second portion of the application data is used by a lower-priority application of the applications.

16. The system of claim 12, wherein
  detection of the error condition comprises detection of an amount of available storage space for use by a first file system being less than a threshold amount,
  the first file system manages application data for a first application of the applications,
  the priority information indicates that the first application is a higher-priority application,
  selection of the error-correcting action comprises selection of a storage device to allocate to the file system,
  the storage device stores redundant data for a second application of the applications, and
  the priority information indicates that the second application is a lower-priority application.

17. A computer readable storage medium comprising program instructions executable to:
  detect an error condition,
    wherein the error condition is associated with a storage resource, and
    wherein an application uses the storage resource to access application data; and
  select an error-correcting action, in response to detection of the error condition, wherein selection of the error-correcting action is based on priority information, wherein the priority information indicates respective priorities of a plurality of applications, and wherein the plurality of applications comprises the application.

18. The computer readable storage medium of claim 17, wherein the error condition creates a conflict between a plurality of applications, the conflict arises when more than one of the applications are contending for use of a storage resource, and selection of the error-correcting action resolves the conflict in favor of a higher-priority application of the applications.

19. The computer readable storage medium of claim 17, wherein detection of the error condition comprises detection of a failure of an active path in a multipathed storage system, the multipathed storage system provides active/passive access, and selection of the error-correction action comprises:
  selection of a new path in the multipathed storage system, wherein
    the selection of the new path is dependent upon whether the new path couples the multipathed storage system to a computing device executing a higher-priority application; and
  assigning an active role to the new path.

20. The computer readable storage medium of claim 17, wherein detection of the error condition comprises detection of a failure of one or more storage devices, the one or more storage devices store application data for more than one of the applications, selection of the error-correcting action comprises selection of a first portion of the application data to be recovered prior to recovery of a second portion of the application data, the first portion of the application data is used by a higher-priority application of the applications, and the second portion of the application data is used by a lower-priority application of the applications.

21. The computer readable storage medium of claim 17, wherein detection of the error condition comprises:
  detection that an amount of available storage space for use by a first file system is less than a threshold amount, the first file system manages application data for a first application of the applications, the priority information indicates that the first application is a higher-priority application, selection of the error-correcting action comprises selection of a storage device to allocate to the file system, the storage device stores redundant data for a second application, and the priority information indicates that the second application is a lower-priority application.

* * * * *